[11] 3,609,231

[72] Inventors Kazuyoshi
Yokohama;
Reiji Hirano, Tokyo, both of Japan
[21] Appl. No. 861,855
[22] Filed Sept. 29, 1969
[45] Patented Sept. 28, 1971
[73] Assignee American Optical Corporation
Southbridge, Mass.

[54] ELECTRON TUBE MANUSCRIPT READER
4 Claims, 4 Drawing Figs.
[52] U.S. Cl. .................................................. 178/7.2,
178/DIG. 2, 313/89, 350/96 B
[51] Int. Cl. .................................................. H04n 1/00
[50] Field of Search ............................................ 178/7.2, 7.2
E, 7.1, DIG. 2; 313/DIG. 5; 350/96 B; 250/219 FR,
219 DQ, 219 ID

[56] References Cited
UNITED STATES PATENTS
3,198,881 8/1965 Knocklein ..................... 178/DIG. 2
3,463,595 8/1969 Blanc et al. ..................... 350/96 B
3,467,774 9/1969 Bryant ........................... 178/DIG. 2

Attorneys—William C. Nealon, Noble S. Williams and Robert J. Bird

ABSTRACT: A cathode-ray tube for electro-optically reading a moving manuscript. The tube includes a long and thin strip of juxtaposed light-conducting fibers extending through its face with corresponding opposite ends of the fibers disposed internally and externally of the tube envelope. Internal ends of the fibers are coated with a light sensitive electron-emissive material which is surrounded by a layer of electroluminous material. A manuscript moved across the strip of light-conducting fibers externally of the tube is read by scanning the coating of electroluminous material along the length of the strip of fibers with an electron beam produced within the tube. Light from the luminous layer, in passing through the tube face, illuminates the manuscript along the outer face of the strip of light-conducting fibers and light reflected from the manuscript in amounts characterized by the subject matter to be read therefrom is transmitted back into the tube by the strip of light-conducting fibers. The light sensitive electron-emissive material at the innermost ends of the fibers emits a pattern of electrons corresponding to the pattern of intensities of light received thereby. These electrons are collected by a target within the tube and produce an electrical charge in the target which may be used as an electrical reading signal per se or converted into other forms of reading information.

PATENTED SEP28 1971　　　　　　　　　　　　　　3,609,231

INVENTORS
KAZUYOSHI NAGAO
REIJI HIRANO

BY Noble␣␣Williams

ATTORNEY

ELECTRON TUBE MANUSCRIPT READER

BACKGROUND OF THE INVENTION

1. Field of the Invention

Electro-optical manuscript readers with particular reference to the use of cathode-ray electron tubes for electro-optically reading manuscripts and the like.

2. Description of the Prior Art

The reading of moving manuscripts by conventional camera tubes is complicated by the requirement for illumination of the manuscript by means externally of the tube wherein difficulty is encountered in affording uniform illumination of a high enough intensity to clearly resolve the manuscript subject matter at an efficient scanning rate.

In this invention a simple, inexpensive and highly efficient reading system comprised of a single cathode-ray tube having self-contained manuscript illuminating means overcomes the drawbacks and inefficiencies of prior art manuscript reading devices and systems.

SUMMARY OF THE INVENTION

According to the present invention, the cathode-ray tube is provided with a narrow strip of light-conducting fibers which extend through its face and serve as reading information transmitting means. The ends of these fibers within the tube are coated with a light sensitive electron-emissive material which, in turn, is surrounded by a coating of electroluminous material. The latter, when bombarded by electrons from the electron beam within the tube, produces high intensity light which is transmitted through the tube face upon a manuscript being moved across the strip of fibers externally of the tube. By so illuminating the manuscript adjacent the outwardly disposed ends of the light-conducting fibers, reflected light characterized in its intensity by subject matter on the manuscript is received by the strip of light-conducting fibers and transmitted therethrough onto the electron-emissive coating at opposite ends of the fibers. Electrons are then emitted in a pattern which is modulated in its intensity according to the light intensity characteristics of the reflected light. This pattern of electrons is received by a target within the tube wherein an electrical signal is produced and utilized as an electrical reading the manuscript or, alternatively, converted into other forms of reading information.

The invention will be more fully understood by reference to the following detailed description when taken in conjunction with the accompanying drawings.

DESCRIPTION OF THE REFERRED EMBODIMENTS

Figure 1:
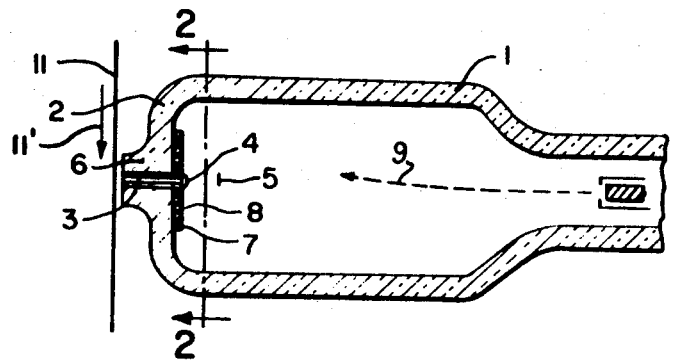
FIG. 1 is a diagrammatic cross-sectional view of one embodiment of the present invention.
Figure 2:
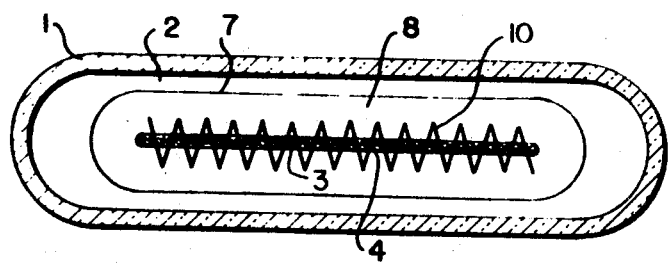
FIG. 2 is a cross-sectional view taken generally along line 2—2 of FIG. 1.

Referring more particularly to FIGS. 1 and 2, the illustrated manuscript reader comprises an electron tube 1 having a transparent face portion 2 through which a long and narrow strip 3 of optical fibers is extended with corresponding opposite ends of the fibers disposed inwardly and outwardly respectively of face portion 2. The fibers of strip 3 are each formed of a high refractive index glass which is coated with a relatively low refraction index material. The strip 3 may be formed of a single row of juxtaposed light-conducting fibers or, as illustrated herein, a plurality of superimposed rows of fibers may be used. In either case, the strip 3 is hermetically sealed within face portion 2 of electron tube 1.

Innermost ends of the fibers of strip 3 are coated with a photosensitive electron-emissive material 4 in front of which is positioned a target 5 adapted to receive electrons emitted by coating 4.

Surrounding the coating 4, and placed against the inner surface of face portion 2, is a layer of electroluminous phosphor material 7 which is covered by a metallic coating 8. Coating 8 functions to improve the illuminating capabilities of layer 7 by reflectively directing light produced in the layer of phosphor forwardly through face portion 2 of the tube.

With a manuscript 11 being continuously moved across the strip 3 of optical fibers externally of tube 1 as illustrated by arrow 11', a beam of electrons 9 is caused to scan across face portion 2 of the tube over the coating of electroluminous material 7 along a path which is diagrammatically illustrated by line 10 in FIG. 2. This path of scanning may, alternatively, be sinusoidal, in the form of a square wave or of any other desired configuration which will cause portions of the electroluminous coating both above and below the strip of optical fibers to become bombarded by electrons from beam 9 as the scan of beam 9 progresses along the length of strip 3 from one end to the other thereof.

Upon such bombardment of the electroluminous material 7 by electron beam 9, light produced therein passes through the transparent face 2 of tube 1 and becomes incident upon manuscript 11 immediately adjacent to the outermost ends of the fibers of strip 3. Portions of this light which are reflected from manuscript 11 and characterized by subject matter such as letters, figures or the like thereon are received by the optical fibers of strip 3 and transmitted therethrough to the electron-emissive coating 4. This causes a pattern of electrons to be emitted from coating 4 and received by target 5. The pattern of electrons, being in varying amounts and/or intensities corresponding to similar characteristics of the light producing same, charges target 5 with an electrical signal which may be used as an electrical reading of the manuscript or converted into other forms of reading information.

Figure 3:
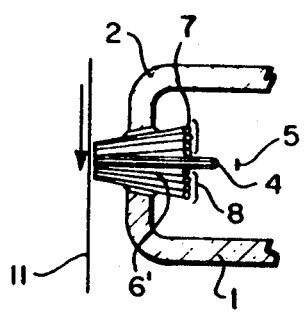
FIG. 3 is a fragmentary cross-sectional view of a modification of the invention.

Greater efficiency in the transmittance of light from electroluminous coating 7 to manuscript 11 may be accomplished by utilizing the highly efficient light-conducting properties of optical fibers in place of the solid glass portion 6 of tube face 2. This is illustrated in FIG. 3 wherein optical fibers 6' are employed to conduct light from luminous coating 7 through face portion 2 of tube 1 to manuscript 11. Fibers 6', being tapered, further serve to concentrate and thus increase the intensity of the light received by manuscript 11.

Figure 4:
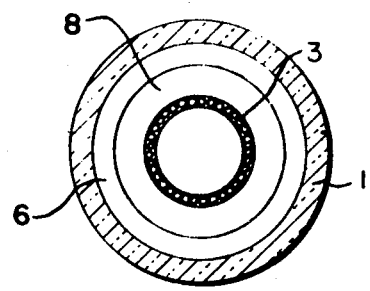
FIG. 4 is a cross-sectional illustration of another modification of the invention.

While the optical fibers which are employed to conduct reflected light from the manuscript 11 back into the tube for excitation of the electron-emissive coating 4 have thus far been illustrated in strip form, they may, alternatively, be arranged in the form of an annulus or other similar configurations generally as illustrated in FIG. 4. In such a case, it would be preferable to employ the use of an electron tube 1 having a circular cross-sectional configuration such as that illustrated in FIG. 4 rather than the elongated generally flat cross-sectional configuration of the electron tube which is illustrated in FIGS. 1–3.

It should now be apparent that the electron tube alone, as a unitary structure, performs the dual function of illuminating a manuscript and at the same time acting as the manuscript reader. In addition to its being a highly efficient illuminating device permitting extremely rapid scanning of a manuscript, the present electron tube provides an exceptionally compact reading unit wherein by simple alteration of the scanning wave form of its electron beam, the amount and/or intensity of the light directed upon a manuscript may be regulated.

We claim:

1. An electro-optical manuscript reader comprising:
    a cathode-ray tube having a transparent face and means for causing a beam of electrons to scan across said face;

a strip of juxtaposed light-conducting fibers extending through said face with corresponding opposite ends of the fibers respectively disposed inwardly and outwardly of the tube;

a coating of electroluminous material on said face surrounding said inwardly disposed ends of said fibers, said luminous material being emissive to light for illuminating a manuscript moved across said outwardly disposed ends of said fibers when said luminous material is scanned by said electron beam;

a coating of light-sensitive electron-emissive material on said inwardly disposed ends of said fibers, said last mentioned coating being emissive to electrons when illuminated by light reflected from said manuscript and rendered incident thereupon by transmittance through said fibers; and a target adjacent said coated ends of said fibers for receiving electrons emitted by said electron-emissive material for use as an electrical reading of said manuscript.

2. An electro-optical manuscript reader according to claim 1 wherein a portion of said cathode-ray tube face surrounding said strip of light-conducting fibers is comprised of a multiplicity of other juxtaposed light-conducting fibers and said coating of electroluminous material is disposed on ends of said other fibers within said tube.

3. An electro-optical manuscript reader according to claim 2 wherein said other light-conducting fibers are each tapered with the largest ends thereof disposed inwardly of said tube and having said coating of electroluminous material thereon.

4. An electro-optical manuscript reader according to claim 1 wherein said strip of light-conducting fibers is annular in configuration.